Dec. 16, 1930.      C. A. BOYER      1,785,614
INDICATOR
Filed May 8, 1929
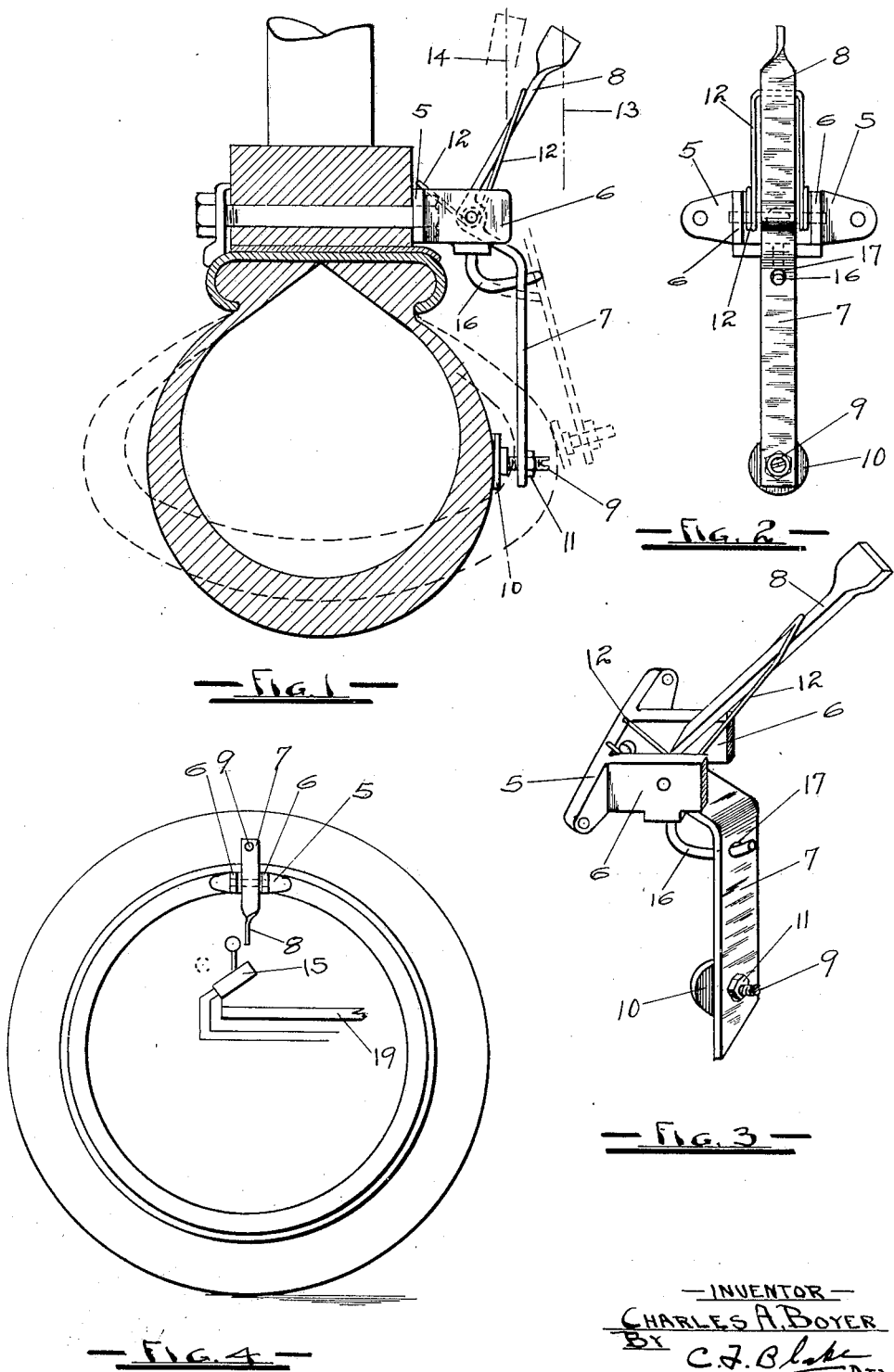
INVENTOR
CHARLES A. BOYER
By C.J. Blake
Att.

Patented Dec. 16, 1930

1,785,614

UNITED STATES PATENT OFFICE

CHARLES A. BOYER, OF TIGGARD, OREGON

INDICATOR

Application filed May 8, 1929. Serial No. 361,348.

My invention relates to indicators in general, and particularly to indicators adapted to indicate to the driver of an automobile when any one of the pneumatic tires thereof becomes partially deflated from any cause. The object of my invention is to provide a device that will indicate to the driver a partially deflated condition of the tire before such condition becomes dangerous to the tire, thus allowing time for further driving before the rim of the wheel pinches the tire between the rim and the road surface. I accomplish this object by means of the construction illustrated in the accompanying drawing, which is a part of this application for Letters Patent, like characters of reference indicating like parts throughout the several views thereof, and in which:

Fig. 1 is a sectional view of a wheel rim and pneumatic tire with my device installed thereupon.

Fig. 2 is a side elevation of my device detached from the wheel.

Fig. 3 is a perspective view of the device.

Fig. 4 is a view of the device upon a wheel, and in position to operate the electric switch.

In general my device consists of a bracket attachable to the wheel, a double armed lever pivoted upon said bracket, one arm thereof contacting with the side of the tire, the other arm lying in a position adapted to pass the said arm close to an electric switch once every revolution of the wheel; means to keep said former arm pressed against the tire, and means to keep said latter arm in a position to contact with said switch when the tire becomes partially deflated.

The bracket is composed of a base 5 having parallel arms 6 extending therefrom. A lever having arms 7 and 8 is pivotally mounted between said arms 6. The arm 7 of said lever is positioned to contact with the side of the tire, as shown in Fig. 1, and at the point of such contact provision is made for an adjustment to allow the device to be set to operate at any desired degree of deflation. Such adjustment is conveniently accomplished by providing a screw 9 threaded into the arm 7, and a washer 10 secured upon the end of said screw, a lock nut 11 being provided to lock the screw in the desired position.

The arm 8 of said lever is held outwardly from the wheel by a spring 12, which spring also serves to keep the washer 10 in contact with the tire. Said arm 8 rotates in a path represented by the broken line 13 in Fig. 1 as long as the tire remains inflated, but changes its position to rotate in a path represented by broken line 14 when the tire becomes partially deflated. In the latter position said arm 8 is in a position to operate a switch 15 as shown in Fig. 4.

When the tire becomes deflated to the condition shown in dotted lines in Fig. 1, it presses the arm 7 into the position also shown in dotted lines, and thereby moves the arm 8 into its position shown by dotted lines wherein it travels in the path represented by broken line 14, in which it is in position to operate the electric switch 15. As the device moves upward towards the top of the wheel the deflection in the tire disappears, and to hold the arms 7 and 8 of the lever in the same positions relative to the wheel that they assumed when the deflected portion of the tire moved them from their initial position I provide a spring 16 secured upon the bracket and downwardly and outwardly curved to pass through an orifice 17 in the arm 7, as shown in Figs. 1, 2, and 3.

When the arm 7 has been moved into the position thereof shown in dotted lines in Fig. 1 said spring 16 will have been released from the orifice 17 and the spring will deflect towards the end of the arm 7, as shown in dotted lines in Fig. 1. Thus by means of said spring 16 the arm 7 is prevented from returning towards the wheel as the device nears the top of the wheel and the deflection of the tire vanishes. Once operated by a deflated tire and moved into the dotted position the spring 12 operates to press the arm 7 upon the end of the spring 16, and thus the arm 8 is retained in its position shown by dotted lines and in the path of travel to operate the electric switch.

The electric switch 15 is shown merely in diagram in Fig. 4, since such switches are well known to the art and form no portion of the present invention. Any suitable type of electric switch may be used, mounted upon a support 19 extending from a convenient portion of the automobile.

By this device the operator of the automobile will be warned of a partially deflated tire before the deflation thereof has progressed so far as to threaten destruction or damage to the tire.

My device may be made of any size, and constructed of any materials deemed suitable and convenient, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In an indicator for pneumatic tires: a bracket adapted to be mounted upon the wheel; a lever pivoted upon said bracket and having an arm adapted to contact with the tire; a second arm upon said lever extending in a substantially opposite direction to said former arm; spring means for retaining said former arm in contact with the tire; and a spring mounted upon said bracket and engaging an orifice in the arm contacting with the tire, from which orifice said spring is removed by movement of said arm and caused to bear against said arm to retain the same in position to operate an electric switch.

2. In an indicator for pneumatic tires: a bracket mountable upon a wheel rim, and having lugs extending therefrom; a lever pivotally mounted between said lugs, having a depending arm adapted to contact with the tire, and an uprising arm adapted to be moved into position to operate an alarm when the tire becomes partially deflated; a spring contacting with said bracket and with said latter arm to hold said former arm in contact with the tire; a retaining spring secured upon said bracket and engaging an orifice in said depending arm, and adapted to snap out of said orifice and into further contact with said arm to retain the same in a predetermined position.

In witness whereof I claim the foregoing as my own I hereunto affix my signature at Portland, county of Multnomah, State of Oregon, this 3rd day of May, 1929.

CHARLES A. BOYER.